US007020429B2

(12) United States Patent

Hamada et al.

(10) Patent No.: US 7,020,429 B2

(45) Date of Patent: Mar. 28, 2006

(54) SHEET SUPPLYING APPARATUS AND IMAGE READING APPARATUS COMPRISING THE SAME

(75) Inventors: Masataka Hamada, Yamanashi-ken (JP); Tetsuya Noda, Minami-Alps (JP); Osamu Jinza, Yamanashi-ken (JP)

(73) Assignee: NISCA Corporation, Yamanashi-Ken (JP)

( * ) Notice: Subject to any disclaimer, the term of this patent is extended or adjusted under 35 U.S.C. 154(b) by 107 days.

(21) Appl. No.: 10/864,422

(22) Filed: Jun. 10, 2004

(65) Prior Publication Data

US 2004/0253030 A1 Dec. 16, 2004

(30) Foreign Application Priority Data

Jun. 12, 2003 (JP) ............................ 2003-167740
Jun. 12, 2003 (JP) ............................ 2003-167741

(51) Int. Cl.
*G03G 15/00* (2006.01)
*B65H 29/00* (2006.01)

(52) U.S. Cl. ...................... 399/367; 399/370; 399/373; 399/374; 271/186

(58) Field of Classification Search ................ 399/367, 399/370, 373, 374; 271/186
See application file for complete search history.

(56) References Cited

U.S. PATENT DOCUMENTS 5,339,139 A * 8/1994 Fullerton et al. ........... 399/203
5,689,793 A * 11/1997 Kobayashi et al. ......... 399/374
5,826,155 A * 10/1998 Kobayashi et al. ......... 399/367
6,393,251 B1 * 5/2002 Kono ......................... 399/370
6,606,464 B1 * 8/2003 Asakawa ..................... 399/51
6,640,082 B1 * 10/2003 Mitomi ...................... 399/374
6,648,320 B1 * 11/2003 Iino et al. .................. 271/3.15
6,795,219 B1 * 9/2004 Fujita ......................... 358/496
6,944,419 B1 * 9/2005 Kawamoto et al. ......... 399/327
2002/0074711 A1 * 6/2002 Higaki ....................... 271/117
2005/0041987 A1 * 2/2005 Lee ............................ 399/16

FOREIGN PATENT DOCUMENTS

JP 2843492 10/1998
JP 2001-354339 12/2001
JP 2003-81474 3/2003

* cited by examiner

*Primary Examiner*—Daniel J. Colilla
*Assistant Examiner*—Marvin P. Crenshaw
(74) *Attorney, Agent, or Firm*—Manabu Kanesaka

(57) ABSTRACT

A sheet supplying apparatus includes a sheet feeding stacker for storing the sheet; a sheet discharging stacker arranged in parallel to the sheet feeding stacker in a vertical direction for storing the sheet; a U-shape conveying path disposed between the sheet feeding stacker to the sheet discharging stacker for guiding the sheet from the sheet feeding stacker to the sheet discharging stacker; a processing platen disposed in the conveying path for processing the sheet; a separating device for separating the sheet on the sheet feeding stacker; a register device for temporarily stopping the sheet and conveying the sheet; a sheet feeding device for conveying the sheet; and a sheet conveying device for conveying the sheet. A sheet discharging device discharges the sheet to the sheet discharging stacker, and an idle roller is disposed in the U-shape conveying path for contacting the sheet to rotate.

20 Claims, 11 Drawing Sheets

100
101
113
112
102
111
109
108
107
110
103
104
105
106
DATA READING SECTION
DATA PROCESSING SECTION
DATA TRANSFER SECTION
CONTROL SECTION
200
202
203
205
206
212
204
207
213
223a
210
208
223b

SHEET SUPPLYING APPARATUS AND IMAGE READING APPARATUS COMPRISING THE SAME

BACKGROUND OF THE INVENTION AND RELATED ART STATEMENT

The present invention relates to a sheet supplying apparatus for sequentially separating a sheet stacked on a stacker and supplying the sheet to a processing platen, so that an image on the sheet is read at the processing platen or the sheet is printed, and also relates to an image reading apparatus such as a copier or a scanning device comprising the sheet supplying apparatus.

In general, a sheet supplying apparatus sequentially separates and delivers a sheet stacked on a sheet feeding stacker to a processing platen such as an image reading platen or a printing platen for processing, and discharges the processed sheet to a sheet discharging stacker. The sheet supplying apparatus is also used as a scanner device for reading an image or as a document feeding apparatus of a copier.

In a conventional sheet supplying apparatus such as a scanner apparatus or a copying apparatus, in many cases, a sheet feeding stacker and a sheet discharging stacker are arranged in a vertical direction in order to reduce an installation space of the apparatus. Sheets such as original documents are supplied from the sheet feeding stacker to the sheet discharging stacker via a U-shape conveying path.

To reduce the size of the apparatus with such a configuration, it is necessary to reduce a distance between the sheet feeding stacker and the sheet discharging stacker, thereby reducing a height and a width of the apparatus. Accordingly, in the height direction of the apparatus, the U-shaped path needs to have a large curvature, thereby feeding a sheet in a curved shape. In the width direction of the apparatus, it is necessary to reduce a size of a driving motor and a transmitting mechanism disposed an outside of a width of a sheet.

While it has been desired to reduce the size and weight of the apparatus, the apparatus needs to handle sheets having various sizes and thicknesses, and made of various materials such as paper and a plastic film. Conventionally, a normal office sheet has a weight between 45 and 180 $gm^2$. For the desk top printing (DPT), a cardboard having at least a weight of 200 $gm^2$ has been recently used, for example, for a front cover. When an apparatus designed for handling sheets having a weight from 45 to 180 $gm^2$ was used for feeding a sheet having a weight of 200 $gm^2$, it was found that the sheet was caught in a U-shaped path and a driving motor was locked, thereby preventing smooth transport. Further, the sheet slipped while moving to a processing platen.

The problem may be caused by friction between the sheet and a transport path extending from the sheet feeding stacker to the sheet discharging stacker. To solve this problem, it is necessary to use a driving motor with high driving power, thereby increasing the size of the apparatus.

Japanese Patent Publication (Kokai) No. 2003-81474 has disclosed a structure in which an idle roller is disposed in the U-shaped path at an upstream side of a processing platen for reducing friction between a sheet and a conveyance guide. Japanese Patent Publication (Kokai) No. 2843492 has disclosed a structure in which idle rollers are arranged in front of and behind a processing platen (image reading platen), respectively, for preventing the processing platen from disturbing a sheet. In the disclosed structure, the idle rollers are placed near the processing platen (image reading platen) and at a central portion of the U-shape conveying path.

However, even if such an idle roller is disposed at a substantially central portion of the U-shaped path for reducing friction, when a distance between a sheet feeding stacker and a discharging stacker is reduced, a sheet receives a large resistance at an outlet of the sheet feeding stacker and an inlet of the sheet discharging stacker, thereby making it difficult to transport the sheet smoothly. When a length of the U-shaped path is reduced, a leading end of the sheet receives a large frictional resistance at a conveyance guide near the discharging stacker and a trailing end of the sheet receives a large frictional resistance at a conveyance guide neat the sheet feeding stacker. Accordingly, even if the idle roller is disposed at a substantially central portion of the U-shaped path, it is difficult to reduce the friction. As a result, with the conventional structures disclosed in the patent references described above, it is difficult to accurately feed a wide range of sheets from thin paper to cardboard. It is also difficult to effectively reduce the size and weight of the apparatus.

Further, in the conventional structures described above, it is difficult to prevent disturbance of a sheet when a leading end thereof enters the processing platen and prevent flip-up of a sheet when a trailing end of the sheet moves away from a sheet feeding roller. In the structure disclosed in Japanese Patent Publication (Kokai) No. 2843492, the idle roller is disposed between the sheet feeding roller and the processing platen. However, in the structure, the sheet feeding roller is provided far away from the processing platen, and the idle roller is simply provided between the processing platen and the sheet feeding roller for reducing the frictional force.

In view of the problems described above, an object of the present invention is to provide a sheet supplying apparatus having a U-shaped path extending from a sheet feeding stacker to a sheet discharging stacker in which a load between a sheet and a guide constituting the path is reduced. It is also an object of the present invention to provide a sheet supplying apparatus with a reduced size and weight for accurately supplying a sheet to a processing plate for reading an image or the like at a stable speed.

Another object of the present invention is to provide a sheet supplying apparatus in which a leading end and trailing end of the sheet are stably guided from a sheet feeding roller to a processing platen, thereby preventing disturbance of the sheet when the leading end of the sheet enters the processing platen and flip-up of the sheet when the trailing end of the sheet moves away from the sheet feeding roller. It is also an object of the present invention to provide a sheet supplying apparatus in which the sheet does not float from the processing platen or is not disturbed by a shock when the sheet is transported downwardly from the processing platen. It is also an object of the present invention to provide an image reading apparatus using the sheet supplying apparatus.

Further objects and advantages of the invention will be apparent from the following description of the invention.

SUMMARY OF THE INVENTION

To accomplish the objects described above, according to the present invention, a sheet supplying apparatus includes a sheet delivering path extending from sheet separating means to register means; a sheet feeding path extending from the register means to sheet feeding means; a sheet processing path extending from the sheet feeding means to sheet conveying means; a sheet discharging path extending from the sheet conveying means to sheet discharging means; and idle rollers provided in each of the paths for rotating idly and contacting a sheet. In the sheet delivering path, the sheet feeding path, and the sheet processing path, the idle rollers are provided in conveyance guides located inside a U-shape conveying path. In the sheet discharging path, the idle rollers are provided in a conveyance guide located outside the U-shape conveying path.

A sheet is conveyed from the sheet feeding stacker to the processing platen while being pulled by a conveying roller at an upstream side. The sheet is smoothly and accurately conveyed by the idle rollers located inside the U-shape conveying path. After passing through the processing platen, the sheet is guided to the sheet discharging roller by the idle roller located outside the U-shape conveying path, thereby significantly reducing conveyance load.

According to the present invention, a sheet supplying apparatus includes a U-shape conveying path for guiding a sheet from a sheet feeding stacker to a sheet discharging stacker arranged in parallel in a vertical direction; a processing platen placed in the conveying path for processing the sheet; separating means for separating the sheet on the sheet feeding stacker; register means for temporarily stopping the sheet fed from the separating means and conveying the sheet toward a downstream side; sheet feeding means for feeding the sheet from the register means to the processing platen; sheet conveying means for conveying the sheet from the processing platen toward a downstream side; and sheet discharging means for discharging the sheet from the sheet conveying means to the sheet discharging stacker. Idle rollers that operate idly in contact with the sheet are provided in each conveyance guide located inside the U-shape path formed of a sheet delivering path from the separating means to the register means, a sheet feeding path from the register means to the processing platen, and a sheet processing path from the sheet feeding means to the sheet conveying means. An idle roller that operates idly in contact with the sheet is provided in a conveyance guide located outside a U-shape path formed of a sheet discharging path from the sheet conveying means to the sheet discharging means.

According to the present invention, each of the register means, the sheet feeding means, the sheet conveying means, and the sheet discharging means may be formed of a pair of rollers contacting each other with the conveying path in between. Accordingly, the U-shape conveying path is composed of the simple pairs of the rollers, thereby reducing the size of the apparatus.

Rollers of the pair of the rollers constituting the register means, sheet feeding means and sheet conveying means located inside the U shape of the conveying path may be formed of driving rollers. Rollers of the pair of the rollers constituting the sheet discharging means located outside the U shape of the conveying path may be formed of driven rollers. Accordingly, it is possible to dispose a power transmitting mechanism (rotating shaft, transmission gear, and the like) for driving the conveying rollers inside an annular conveying path, thereby making the apparatus compact.

The processing platen is provided with image processing means for reading an image on the sheet. Accordingly, it is possible to handle a wide range of sheets from cardboard to thin paper while the sheets are conveyed from the sheet feeding stacker to the sheet discharging stacker for reading an image.

At least three rows of the idle rollers may be arranged in the sheet feeding path in a sheet conveying direction. Accordingly, the sheet is conveyed by the three rows of the idle rollers when drawn by the strongest force in the U-shaped path, thereby conveying the sheet smoothly.

At least one of the idle rollers in the sheet feeding path is placed near a sensor lever that detects a leading end of the sheet. Accordingly, the idle rollers regulate the leading end of the sheet to abut against the sensor lever, thereby accurately detecting the leading end of the sheet.

In the processing path, the idle rollers are arranged at an upstream side and a downstream side of the processing platen, respectively. Accordingly, the idle rollers located in front of and behind the processing platen guide and regulate the leading end of the sheet entering the processing platen and the trailing end of the sheet moving out of the processing platen, thereby enabling stable sheet conveyance.

The idle rollers located at an upstream side of the processing platen are placed so that an outer periphery of each of the idle rollers crosses an outer periphery of the corresponding roller constituting the sheet feeding means in the sheet conveying direction. Accordingly, when the leading end of the sheet enters the processing platen, the sheet is stably guided to the processing platen by the sheet feeding roller and the idle rollers even if the sheet is curved.

At least one of the idle rollers in the sheet discharging path projects from a sheet contact surface of the rollers constituting the sheet discharging means for bending the sheet in a direction perpendicular to the conveying direction. Accordingly, when the sheet discharging roller conveys the sheet, the sheet is bent in the direction orthogonal to the conveying direction, so that the sheet is securely housed in the sheet discharging stacker using rigidity of the sheet.

One row of the idle rollers is disposed in the sheet delivering path. Three rows of the idle rollers are arranged in the sheet feeding path. Two rows of the idle rollers are arranged in the sheet processing path. Three rows of the idle rollers are arranged in the sheet discharging path. Accordingly, a wide range of sheets from cardboard to thin paper can be conveyed.

A circulating path may be provided for guiding the sheet from the sheet discharging means to the register means, and idle rollers are arranged in the circulating path to operate idly in contact with the sheet. Accordingly, it is possible to turn the sheet upside down after the sheet is processed at the processing platen, so that the processing platen can process a back surface of the sheet. During the process, the sheet can be smoothly conveyed.

According to the present invention, an image reading and supplying apparatus includes a U-shape conveying path for guiding a sheet from a sheet feeding stacker to a sheet discharging stacker arranged in parallel in a vertical direction; a processing platen placed in the conveying path for processing the sheet; photoelectric converting means for reading an image on the sheet on the processing platen; separating means for separating the sheet on the sheet feeding stacker; register means for temporarily stopping the sheet from the separating means and conveying the sheet toward a downstream side; sheet feeding means for conveying the sheet from the register means to the processing platen; sheet conveying means for conveying the sheet from the processing platen downstream; and sheet discharging means for discharging the sheet from the sheet conveying means to the sheet discharging stacker. Idle rollers that operate idly in contact with the sheet are provided in each conveyance guide located inside a U shape constituting each of a sheet delivering path from the separating means to the register means, a sheet feeding path from the register means to the processing platen, and a sheet processing path from the sheet feeding means to the sheet conveying means. Idle rollers that operate idly in contact with the sheet are provided in a conveyance guide located outside a U shape constituting a sheet discharging path from the sheet conveying means to the sheet discharging means. Accordingly, it is possible to read the image while the sheet is fed from the sheet feeding stacker to the sheet discharging stacker. The sheet can be smoothly conveyed and a wide range of sheets can be read.

According to the present invention, to accomplish the second object, a sheet feeding roller is disposed adjacent to a processing platen for guiding a sheet to the processing platen. Idle rollers are disposed between the sheet feeding roller and the processing platen. The sheet feeding roller and the idle rollers are arranged to cross each other in a sheet conveying direction, so that the sheet is guided to the processing platen.

According to the present invention, a sheet supplying apparatus comprises a sheet processing platen; a sheet feeding roller for supplying a sheet to the processing platen; a sheet conveying roller for conveying the sheet out of the processing platen; and a guide member placed opposite to the processing platen so as to form a sheet conveying path and extending from the sheet feeding rollers to the sheet conveying rollers. The sheet feeding roller is formed of two or more rollers spaced from one another in a direction orthogonal to the sheet conveying direction. Idle rollers operating idly in contact with the sheet are arranged so that an outer periphery of each idle roller crosses an outer periphery of the sheet feeding roller in the sheet conveying direction. The sheet is guided to the processing platen with the outer periphery of the sheet feeding roller and the outer periphery of the idle roller. Accordingly, the leading end and trailing end of the sheet are guided to the processing platen using the sheet feeding roller and the idle rollers crossing the sheet feeding roller, thereby preventing the leading or trailing end of the sheet from flipping up.

According to the present invention, the sheet feeding roller and the sheet conveying roller may be arranged above the processing plate. Also, the guide member placed opposite to the processing platen and extending from the sheet feeding roller to the sheet conveying roller is formed in a substantially U-shape. Accordingly, even if the conveying path is arranged such that the sheet enters the processing plate from above and is conveyed upwardly above the processing plate, it is possible to smoothly convey the sheet when the leading end of the sheet enters the processing platen. Further, it is possible to reduce an influence of the flip-up on processing accuracy when the trailing end of the sheet leaves the sheet feeding roller.

According to the present invention, the sheet feeding roller, the idle rollers, and the guide member may be arranged so that the sheet is guided from the sheet feeding roller to the processing platen via the sheet feeding roller and the idle rollers in this order. Accordingly, it is possible to guide the leading and trailing ends of the sheet from the sheet feeding roller to the processing platen without contacting the guide member with less frictional resistance, thereby passing the sheet over the processing platen at a stable speed from the leading end to the trailing end.

According to the present invention, each of the sheet feeding roller and the sheet conveying roller may be formed of a pair of rollers contacting each other. A roller provided in the guide member and facing the processing platen is connected to a driving motor. Accordingly, the sheet feeding roller applies the conveying force to the sheet, and the idle rollers crossing the sheet feeding roller guide the sheet to the processing platen, thereby reducing a variation in the conveying force exerted on the sheet.

According to the present invention, the idle rollers contacting the sheet to move together may be disposed between the processing platen and the sheet conveying roller. Accordingly, the idle rollers guide the leading end of the sheet passing through the processing platen to the sheet conveying roller, thereby preventing a shock vibration from spreading the entire sheet due to a change in the posture of the sheet when the leading end of the sheet rushes into the sheet conveying roller.

According to the present invention, the sheet feeding roller and the sheet conveying roller may be arranged so as to engage the sheet at a same position in a direction orthogonal to the conveying direction. Further, the idle rollers placed so as to cross the sheet feeding roller and the idle rollers placed between the processing platen and the sheet conveying roller may be arranged so as to engage the sheet at a same position in the direction orthogonal to the conveying direction. Accordingly, the sheet passing through the processing platen engages the sheet feeding roller at an upstream side and the sheet conveying rollers at a downstream side at the same position, thereby stably conveying the sheet without applying stress.

According to the present invention, a sheet supplying apparatus comprises a U-shape conveying path for guiding a sheet from a sheet feeding stacker to a sheet discharging stacker arranged in parallel in a vertical direction; a processing platen placed in the conveying path for processing the sheet; a sheet feeding roller for conveying the sheet from the sheet feeding stacker to the processing platen; a sheet conveying roller for conveying the sheet from the processing platen toward a downstream side; and a sheet discharging roller for discharging the sheet from the sheet conveying roller to the sheet discharging stacker. The sheet feeding roller is composed of two or more rollers spaced in a direction orthogonal to a sheet conveying direction. Idle rollers operating idly in contact with the sheet are placed between the rollers so that an outer periphery of each idle roller crosses an outer periphery of the corresponding roller in the sheet conveying direction, so that the sheet is guided to the processing platen using the outer periphery of the sheet feeding roller and the outer periphery of the idle roller. Accordingly, the sheet supplying apparatus supplies the sheet from above the processing plate of an image reading apparatus and discharges the sheet upwardly above the processing plate.

According to the present invention, an image reading apparatus includes a U-shape conveying path for guiding a sheet from a sheet feeding stacker to a sheet discharging stacker arranged in parallel in a vertical direction; photoelectric converting means for reading an image on the sheet on a processing platen; separating means for separating the sheet on the sheet feeding stacker; register means for temporarily stopping the sheet from the separating means and conveying the sheet toward a downstream side; a sheet feeding roller for conveying the sheet from the register means to the processing platen; a sheet conveying roller for conveying the sheet from the processing platen toward a downstream side; and sheet discharging means for discharging the sheet from the sheet conveying means to the sheet discharging stacker. The sheet feeding roller is composed of two or more rollers spaced in a direction orthogonal to a sheet conveying direction. Idle rollers operating idly in contact with the sheet are placed between the rollers so that an outer periphery of each idle roller crosses an outer periphery of the corresponding roller in the sheet conveying direction, so that the sheet is guided to the processing platen using the outer periphery of the sheet feeding roller and the outer periphery of the idle roller. Accordingly, it is possible to prevent image blur at leading and trailing ends of the sheet in the image reading apparatus.

DETAILED DESCRIPTION OF PREFERRED EMBODIMENTS

Figure 1:
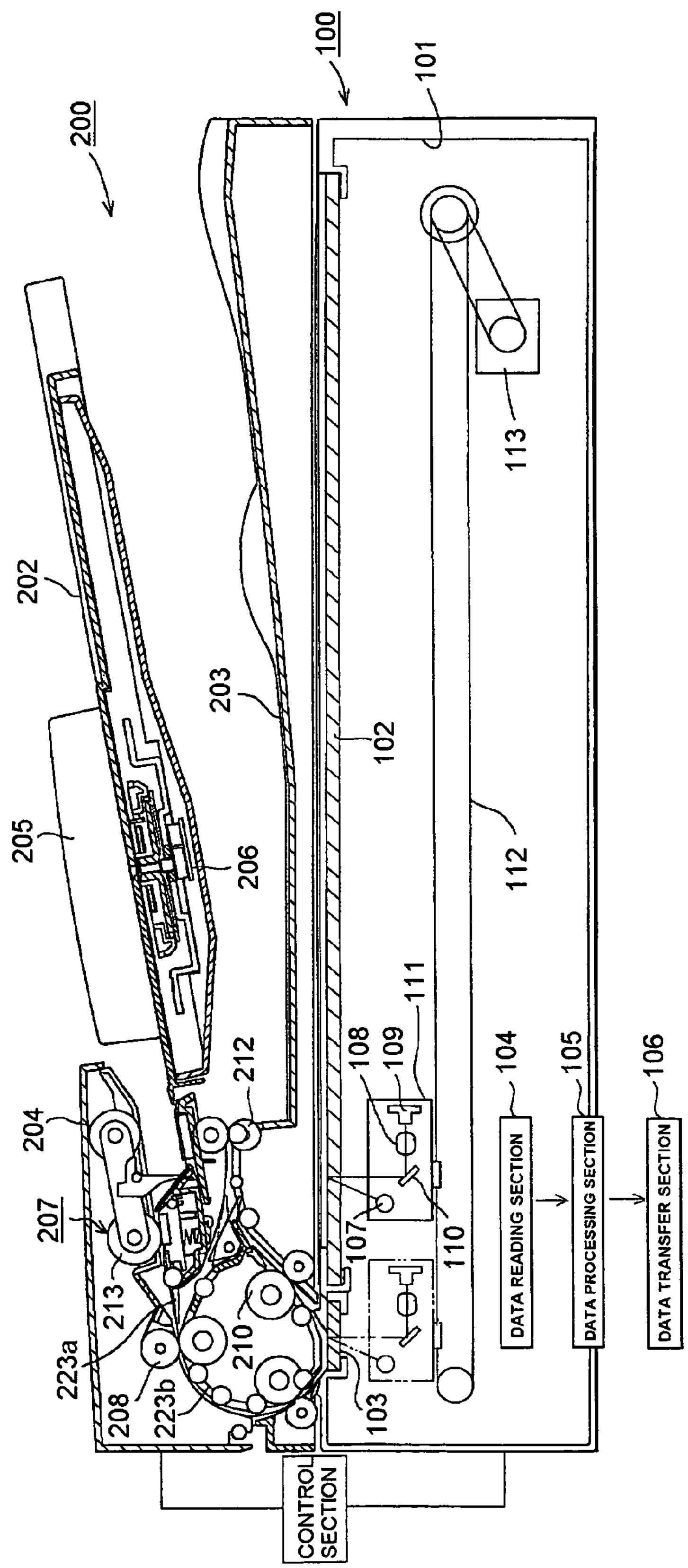
FIG. 1 is a view illustrating an image reading apparatus according to an embodiment of the present invention.
Figure 2:
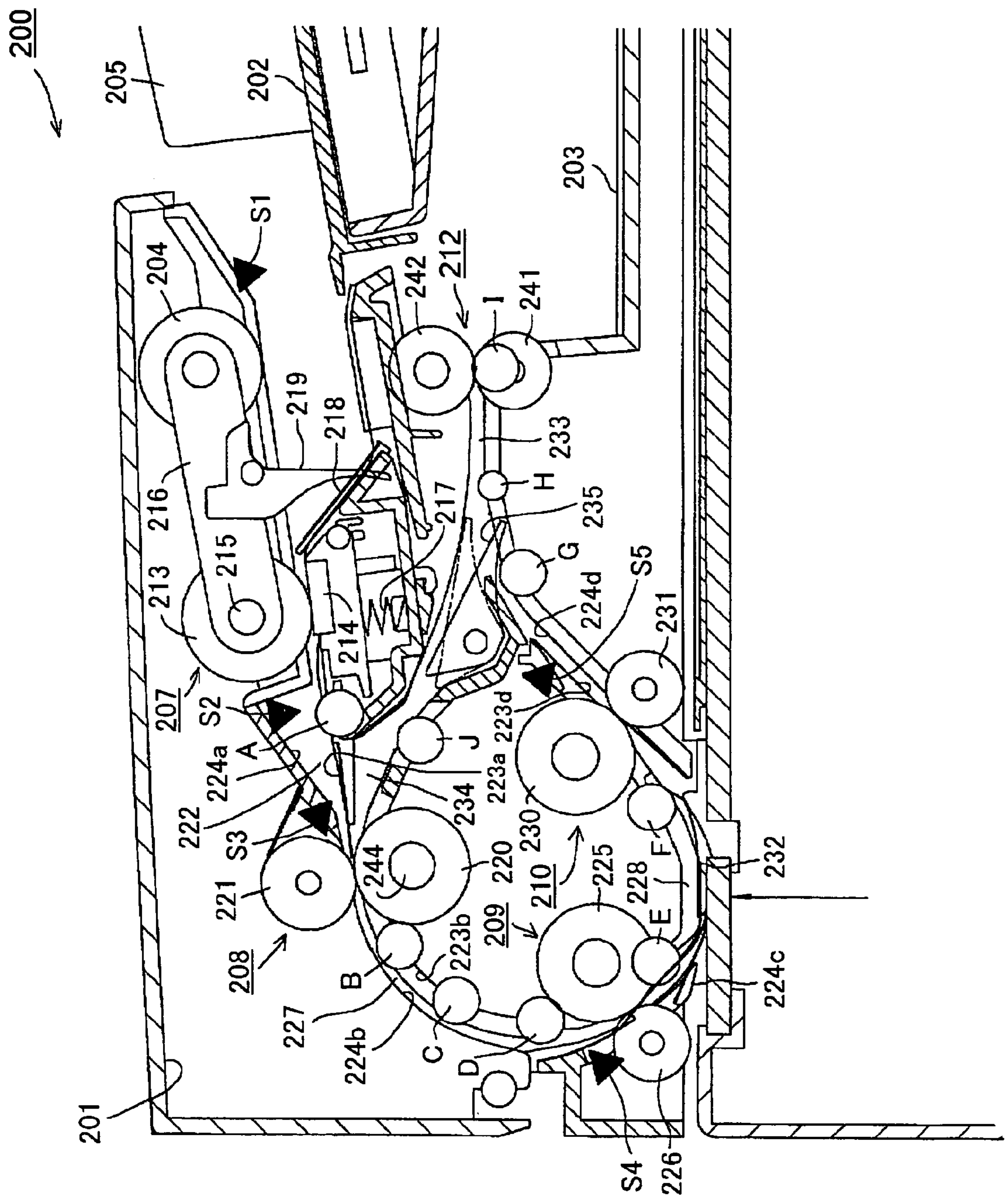
FIG. 2 is an enlarged view showing an essential part of a sheet feeding portion shown in FIG. 1.
Figure 3:
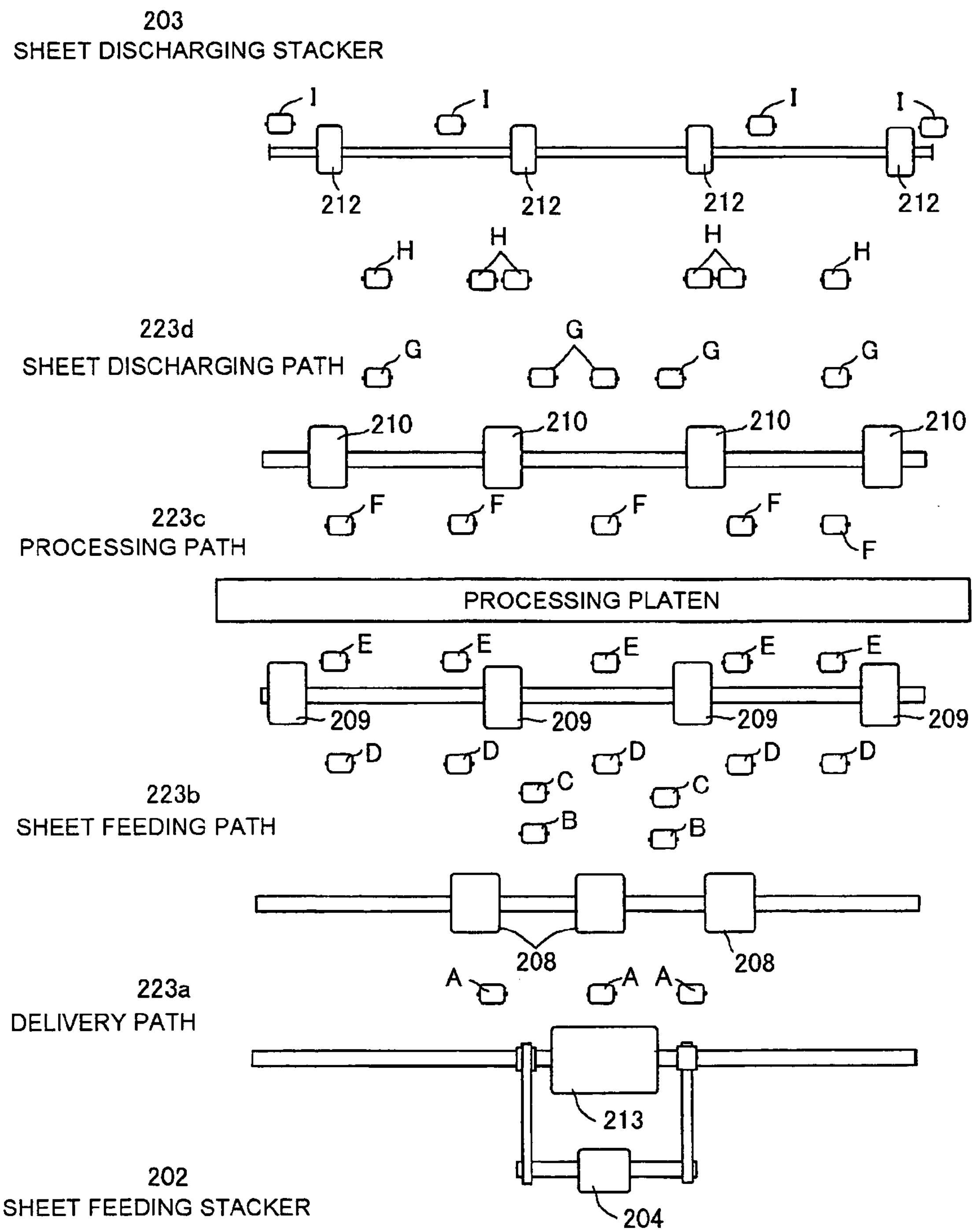
FIG. 3 is a view showing an arrangement of conveying rollers in a state that a conveying path shown in FIG. 1 is two-dimensionally expanded.

Hereunder, embodiments of the present invention will be described below in detail with reference to the accompanying drawings. The figures show embodiments in which the present invention is applied to an image reading apparatus. FIG. 1 is a view illustrating the whole image reading apparatus. FIG. 2 is a view illustrating an essential part of a sheet supplying apparatus. FIG. 3 is a view illustrating idle rollers arranged in a U-shaped path.

In FIG. 1, the image reading apparatus is composed of an image reading unit 100 and a sheet supplying unit 200. The units are incorporated into independent casings 101 and 201, respectively. The image reading unit 100 is composed of platens 103 and 103 incorporated into the casing 101 for placing original sheets (documents); a data reading section (image reading means) 104 for optically reading an image on each sheet on the platen; a data processing section 105 for processing an image signal from the reading section; and a data output section 106 for transferring data to a computer, a copier, or other main apparatuses.

Each of the platens 102 and 103 is constructed by attaching transparent glass to the top surface of the casing 101. The first platen 102 is formed of a glass plate for placing the maximum-size sheet. The second platen 103 is formed of a glass plate having an appropriate length for sequentially reading every line of image on the sheet passing on the platen (lateral direction in FIG. 1) and a width larger than a width of the maximum-size sheet (depth direction in FIG. 1). The two platens, i.e. the first and second platens 102 and 103, are provided so that the second platen 103 can read an image on the sheet sequentially fed by the sheet feeding unit 200, while a book or a large-size document, which are difficult to feed, can be set on the first platen 102 for reading.

Accordingly, depending on the configuration of the apparatus, the first platen 102 need not be provided or the first and second platens need not be formed of separate glass plates. Both first and second platens may be formed of a single glass plate.

The reading section (image reading section) 104 is composed of a light source 107 that irradiates light on an original sheet on the platen 102 or 103; an image forming lens 108 that condenses light reflected from the original sheet; and a photoelectric converting element 109 that converts light from the image forming lens 108 into an electric signal. Known photoelectric converting elements include a CCD that accumulates electricity induced by light from the image forming lens 108 and then outputs it as an electric signal, and an adhesion type device comprising a light source image forming lens formed integrally with a photosensitive layer. The illustrated reading section 104 is constructed by mounting the photoelectric converting element 109 and the like on a carriage 111 that is freely movable along the first platen 102.

Specifically, the carriage is constructed by using the photoelectric converting element 109*a* composed of a line sensor (CCD) that reads every line of an image on the original sheet (line order) and by incorporating a mirror 110 that deflects light reflected from the original into a block made of a resin. The carriage 111 is reciprocated along a guide rail (not shown) in the lateral direction of FIG. 1 using a timing belt 112 and a carriage driving motor 113. The carriage 111 moves along the first platen 102 in the lateral direction in FIG. 1 and is fixed (stationary) at a reading position on the second platen 103. The carriage driving motor is controlled so as to read images, in the line order, on the original sheets passing on the first platen 103.

A data processing section 105 converts image data from the reading section 104 into digital data. The data processing section 105 then executes a data correction such as dither or a gamma correction on the digital data. An image transfer section 106 transfers the processed data to external equipment. The image transfer section 106 electrically transmits image information from the original sheet to a computer, a facsimile machine, a copier, or a network server.

The sheet supplying unit 200 can be attached to the image reading unit. The sheet supplying unit 200 comprises a sheet feeding stacker 202 and a sheet discharging stacker 203 arranged in a casing 201 in parallel in a vertical direction. In the figure, the sheet feeding stacker 202 is placed in the upper part of the casing, while the sheet discharging stacker 203 is placed in the lower part of the casing. Conversely, the sheet feeding stacker 202 may be placed in the lower part of the casing, while the sheet discharging stacker 203 is placed in the upper part of the casing.

The sheet feeding and discharging stackers 203 and 203 of the sheet feeding unit 200 are attached to the image reading unit 100 above the first platen 102. The sheet feeding and discharging stackers 203 and 203 are hinged to the rear side of the image reading unit 100 shown in the figure. The sheet feeding and discharging stackers 203 and 203 are attached so as to be freely opened and closed so as to open the first and second platens.

The sheet feeding stacker 202 is composed of a tray for placing the original sheets. The sheet feeding stacker 202 is provided with a pickup roller 204 on the leading end thereof for sequentially delivering the sheets stacked on the stacker. Set references are provided on the sheet feeding stacker 202 so that the original sheets of different sizes can be set using center reference or one-side reference. In the figure, a pair of side edge guide plates 205 is provided on the tray so as to be freely movable in the direction of the sheet width (direction orthogonal to a sheet feeding direction). The side edge guide plates 205 regulate the opposite side edges of the sheet using the center reference. The side edge guide plates 205 of the lateral pair are caused to approach and leave by the same amount using an interlocking mechanism 206 located on a back surface of the tray. Various types of interlocking mechanisms are known, and a description of the interlocking mechanism 206 is omitted.

The sheet feeding stacker 202 and the sheet discharging stacker 203 are connected together so that the sheets can be fed through a conveying path formed in a substantially U-shape shown in FIG. 1. The structure will be described below with reference to FIGS. 2 and 3. The U-shape conveying path is provided between the sheet feeding stacker 202 and sheet discharging stacker 203 arranged in parallel in the vertical direction. The sheet processing platen is provided in the conveying path.

In the image reading apparatus, the sheet processing platen is composed of the second platen 103. Thus, the sheet feeding stacker 202, separating means 207, register means 208, sheet feeding means 209, processing platen (second platen 103), sheet conveying means 211, and sheet discharging means 212 are arranged in the conveying path in this order. The separating means 207 is provided at the leading end of the sheet feeding stacker 202 and composed of a separating roller 213 and a friction pad 214 contacting the separating roller 213. The separating means 207 sequentially separates the sheet on the sheet feeding stacker 202. The register means 208 is composed of pairs of rollers 220 and 221 contacting each other and arranged at a downstream side of the separating means 207.

Reference numeral 220 denotes a driving roller, and reference numeral 221 denotes a driven roller. The sheet feeding means 209 is composed of sheet feed driving rollers 225 and sheet feed driven rollers 226, in which each of the sheet feed driving rollers 225 is pressed against the corresponding sheet feed driven roller 226. The sheet feeding means 209 is placed at a downstream side of the register means 208. The sheet conveying means 211 is composed of conveyance driving rollers 230 and conveyance driven rollers 231. The sheet discharging means 212 is composed of sheet discharge driving rollers 241 and sheet discharge driven rollers 242 in which each sheet discharge driving roller 241 is in pressure contact with the corresponding sheet discharge driven roller.

The sheet separating means 207 is composed of the separating roller 213 for delivering the sheet in the sheet feeding direction, and the friction pad 214 contacting the separating roller. The separating roller 213 is constructed by attaching a rubber roller to a rotating shaft 215 connected to a driving motor, described later. The separating roller 213 is composed of one roller (rotating body) located in the center of the sheets on the sheet feeding stacker. The rotating shaft 215 is provided with a bracket 216 extending toward the sheet feeding stacker 202. The pickup roller 204 is attached to the leading end of the bracket 216.

The separating roller 213 is attached to the rotating shaft 215 via a spring clutch to transmit the rotation of the rotating shaft 215 in one direction to the roller 213, while not transmitting the reverse (counterclockwise direction of FIG. 2) rotation of the rotating shaft 215 to the roller 213. A spring clutch is also provided between the rotating shaft 215 and the bracket 216. Thus, when the rotating shaft 215 rotates counterclockwise in FIG. 1, the bracket 216 is pivoted upwardly above the sheet feeding stacker 202. When the rotating shaft 215 rotates clockwise in FIG. 1, the clutch is released to allow the bracket 216 and the pickup roller 204, attached to the bracket 216, to lower owing to their own weights. A transmission belt transmits only the rotation of the rotating shaft 215 in the clockwise direction in FIG. 1 to the pickup roller 204 via a one way clutch.

Accordingly, when the rotating shaft 215*b* rotates clockwise in FIG. 1, the separating roller 213 and the pickup roller 204 rotate in the direction in which the sheet is delivered. The pickup roller 204 and the bracket 216 lower toward the sheet feeding stacker 202. When the rotating shaft 215 rotates counterclockwise, the bracket 216 moves to a withdrawn position above the sheet feeding stacker 202, while the rollers 213 and 204 remain stationary.

On the other hand, the friction pad 214, composed of an elastic material, is in pressure contact with the separating roller 213 using an urging spring 217. A pre-handling member 218 is provided at the leading end of the sheet feeding stacker 202. Accordingly, the pickup roller 204 sequentially delivers the sheets on the sheet feeding stacker 202, and the pre-handling member 218 arranges the sheets in a wedge form to feed each of the sheets between the separating rollers 209 and the friction pad 214. The friction pad 214 and the separating roller 213 are formed so as to exert a predetermined frictional force with respect to the friction coefficient between the sheets. The separating roller delivers only one sheet.

Reference numeral 219 in the figure denotes a gate stopper rotatably attached to the bracket 216. When the pickup roller 204 is located at the withdrawn position above the sheet feeding stacker 202, the gate stopper 219 is positioned as shown in the figure. The gate stopper 19 is pivoted clockwise in FIG. 1 in union with the lowering of the pickup roller 204 toward the stacker. Thus, a path is formed into which the sheet can advance. The gate stopper 219 prevents the sheets from being carelessly thrust when the sheets are set on the stacker. In the present invention, the separating means 207 is composed of the separating roller and the friction pad. However, an endless belt may be used in place of the separating roller. The friction pad may be replaced with a retard roller that rotates in the direction opposite to that in which the separating roller rotates.

The register means 208 is provided at a downstream side of the separating means 207. The register means 208 is composed of the pairs of register rollers 220 and 221 that are in pressure contact with each other so as to sandwich the sheet between them. When the separating roller 213 delivers the sheet with the pair of rollers 208 and 221 stopped, the leading end of the sheet abuts against the roller. The sheet is thus stopped and bent. Then, the roller pair 208 is rotated to deliver the sheet while correcting its orientation. The register means may be composed of gate paws that can be pushed into and pulled out of the sheet path, in place of the roller pair. Thus, the distance between the separating roller 213 and the register roller pairs 220 and 221 is sufficient to bend the sheet and is optimum for arranging the conveying rollers in the conveying path.

A delivering path 222 is formed between the separating roller 213 and the register roller pairs 220 and 221 using a first conveyance guide 223. The first conveyance guide 223 is constructed as a sheet guide at an inside of the whole U-shape conveying path. A small spacing is formed between the first conveyance guide 223 and a second conveyance guide 224 at an outside of the U-shape path. That is, in the U-shape conveying path from the sheet feeding stacker 202 to the sheet discharging stacker 203, the spacing is formed between the inner conveyance guide 223 and the outer conveyance guide 224 so that the sheet can pass through the spacing. The first conveyance guide 223 is formed of a synthetic resin having an annular shape. Components described later are incorporated into the first conveyance guide 223. The second conveyance guide 224 is formed integrally with the casing 201.

The delivering path 222 is composed of guides 223*a* and 224*a*. The guide 224*a* is positioned so as to form a space in which the sheet is bent like a loop (space for register). The sheet feeding rollers 209 are provided at a downstream side of the register means 208 and composed of the sheet feed driving rollers 225 and sheet feed driven rollers 226. Each of the sheet feed driving rollers 225 is in pressure contact with the corresponding sheet feed driven roller 226. The sheet feeding rollers 209 are provided near the downstream processing platen to accurately feed the sheet to the processing platen when the leading end of the sheet is detected by a timing sensor S4, described later.

A conveying path 227 is composed of the guides 223*b* and 224*b* between the register means 208 and the sheet feeding rollers 209. The processing platen (second platen 103) is provided at a downstream side of the sheet feeding rollers 209. A backup plate 228 is attached to the first conveyance guide 223 so that a small spacing is formed between the backup plate 228 and the second platen 103. The sheet conveying means 211 is placed at a downstream side of the processing platen 103 and composed of the conveyance driving rollers 230 and the conveyance driven rollers 231. Accordingly, the sheet feeding rollers 209 and the sheet conveying rollers 211 are constructed near the processing platen 103 so that the sheet can be fed to the processing platen 103 and conveyed out of the processing platen. A sheet processing path 232 is formed between the sheet feeding rollers 209 and the sheet conveying rollers 211 using guides 223C and 224C, the second platen 103, and the backup plate 228.

The sheet discharging roller 213 is placed at a downstream side of the sheet conveying rollers 211. A sheet discharging path 233 is formed between the sheet conveying rollers 211 and the sheet discharging roller 213 using guides 223*d* and 224*d*. The sheet discharging stacker 203 is placed immediately behind the sheet discharging roller 213.

Therefore, the sheet from the sheet feeding stacker 202 is fed to the sheet discharging stacker 203 through the delivering path 222, sheet feeding path 227, processing path 232, and sheet discharging path 233. These paths constitute the U-shape conveying path. As shown in the figure, a circulating path 234 extends from the sheet discharging path 233 to the sheet feeding path 227 and is composed of guides 223*e* and 224*e*. Reference numeral 234 denotes a path switching gate.

According to the present invention, idle rollers A are placed in the delivering path 222, and idle rollers B, C, and D are arranged in the sheet feeding path 227. Idle rollers E and F are arranged in the processing path 232, and idle rollers G, H, and I are arranged in the sheet discharging path 233. This will be described below in detail.

In the delivering path 222, the idle rollers A are disposed on the conveyance guide 223*a* of the conveyance guide 223, located inside the U shape path for contacting the sheet to rotate together. The conveyance guide 223*a* is constructed as a part of the first conveyance guide 223 and is formed of an annular plastic. Three notches 236 are formed in the conveyance guide 223*a* shown in FIG. 3. The idle rollers A are rotatably incorporated into these notches. Each of the idle rollers A is formed of a polyester resin integrated with a central shaft. The central shafts are fitted into respective bearing grooves formed in the conveyance guide 223*a* and rotatably attached to the conveyance guide 223*a*.

The idle rollers A are attached so as to project from the guide 223*a* toward the path. The idle rollers A are arranged at a number of positions in the direction of the sheet width. In the figure, the sheet is conveyed with the center reference, so that the idle rollers A are preferably arranged laterally symmetrically with respect to the center reference. That is, one idle roller A is placed at the center, and two other idle rollers A are arranged at the right and left sides of the center, respectively. In particular, the separating roller 213, constituting the separating means 207, separates the sheet and feeds the sheet to the pairs of register rollers 220 and 221. Then, the separating roller 213 stops and is controlled so as to avoid delivering the second and subsequent sheets. Thus, the idle rollers A are preferably arranged so as to reduce loads when the downstream register rollers and sheet feeding rollers withdraw the sheet out of the separating roller 213.

As shown in FIG. 3, the pickup roller 204, the separating roller 213, the idle rollers A, and the pairs of register rollers 220 and 221, or 208, are arranged so as to form a triangle. That is, the separating roller 213 contacts the sheet at one position in the center of the sheet width. The idle rollers A contact the sheet at three positions outside in the direction of the sheet width. The pairs of the register rollers 220 and 221 formed at three positions are arranged so as to contact the sheet further outside in the direction of the sheet width. This arrangement enables the sheet to be smoothly conveyed and simultaneously prevents the sheet from being wrinkled. The conveyance guide 224*a* disposed opposite to the conveyance guide 223*a*, in which the idle rollers A are disposed, is placed so as to form a space in which the sheet is flexed like a loop.

A configuration of the idle rollers B, C, and D arranged in the sheet feeding path 227 will be explained next. The sheet feeding path 227 is composed of the conveyance guide 223*b* (part of the first conveyance guide) and the conveyance guide 224*b* (part of the second conveyance guide). The conveyance guide 223*a* is composed of a part of the first conveyance guide 223, formed in an annular resin part. The conveyance guide 224*b* is similarly molded of a synthetic resin integrally with the casing 201 of the sheet supplying unit 200. Specifically, a large number of ribs are formed on an inner wall of the casing 206. The leading ends of the ribs are bent in the sheet conveying direction to constitute the conveyance guide 223*b*.

As shown in FIG. 3, the idle rollers B, C, and D are arranged in the conveyance guide 223*b*. The register driving rollers 220, the idle rollers B, C, and D, and the sheet feeding rollers 209 are arranged in the conveyance guide 223*b* in this order from an upstream side to a downstream side. Each of the register driving rollers 220 and sheet feeding rollers 209 is composed of the driving roller connected to the driving motor as described later. These rollers are made of a resin such as polyacetal. Like the idle rollers A, each of the idle rollers B, C, and D is molded of a resin such as polyacetal so that a roller main body is integrated with a rotational center shaft. Each of the idle rollers B, C, and D is incorporated into the conveyance guide 223*b* by inserting the roller main body into a notch formed in the conveyance guide 223*b*, and fitting the rotational center shaft into a bearing groove formed in the conveyance guide 223*b*. Thus, the idle rollers B, C, and D can be easily manufactured and assembled.

Figure 4:
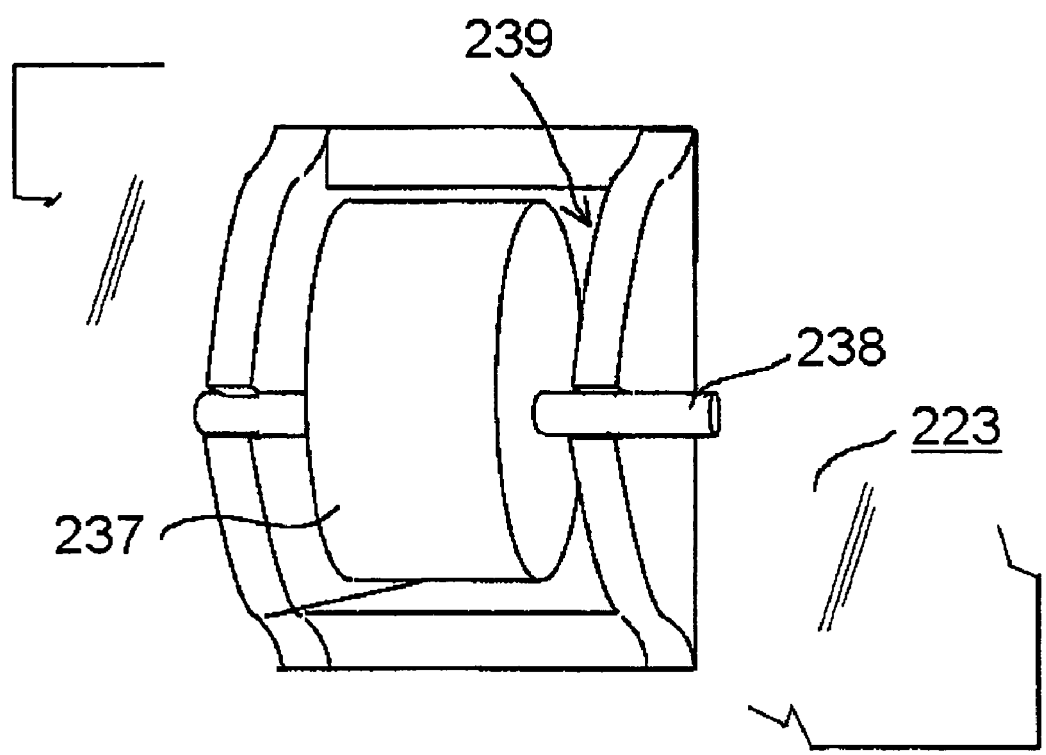
FIG. 4 is a view showing an assembled structure of an idle roller according to the embodiment of the present invention.

FIG. 4 shows the idle rollers B, C, and D incorporated into the conveyance guide 223*b*. A similar structure can be employed for the idle rollers A, E to I and J, described later. Notches 236 are formed in the conveyance guide 223*b* by molding resin so that the rollers 237 can be inserted in the respective notches 236. A pair of bearing grooves 239 is formed near each notch 236 so that a central shaft 238 of the corresponding roller can be fitted into the pair of bearing grooves 239. Since the synthetic resin has elasticity, it is possible to fittingly hold the rollers. Thus, the rollers 237 are rotatably incorporated into the conveyance guide.

Figure 5:
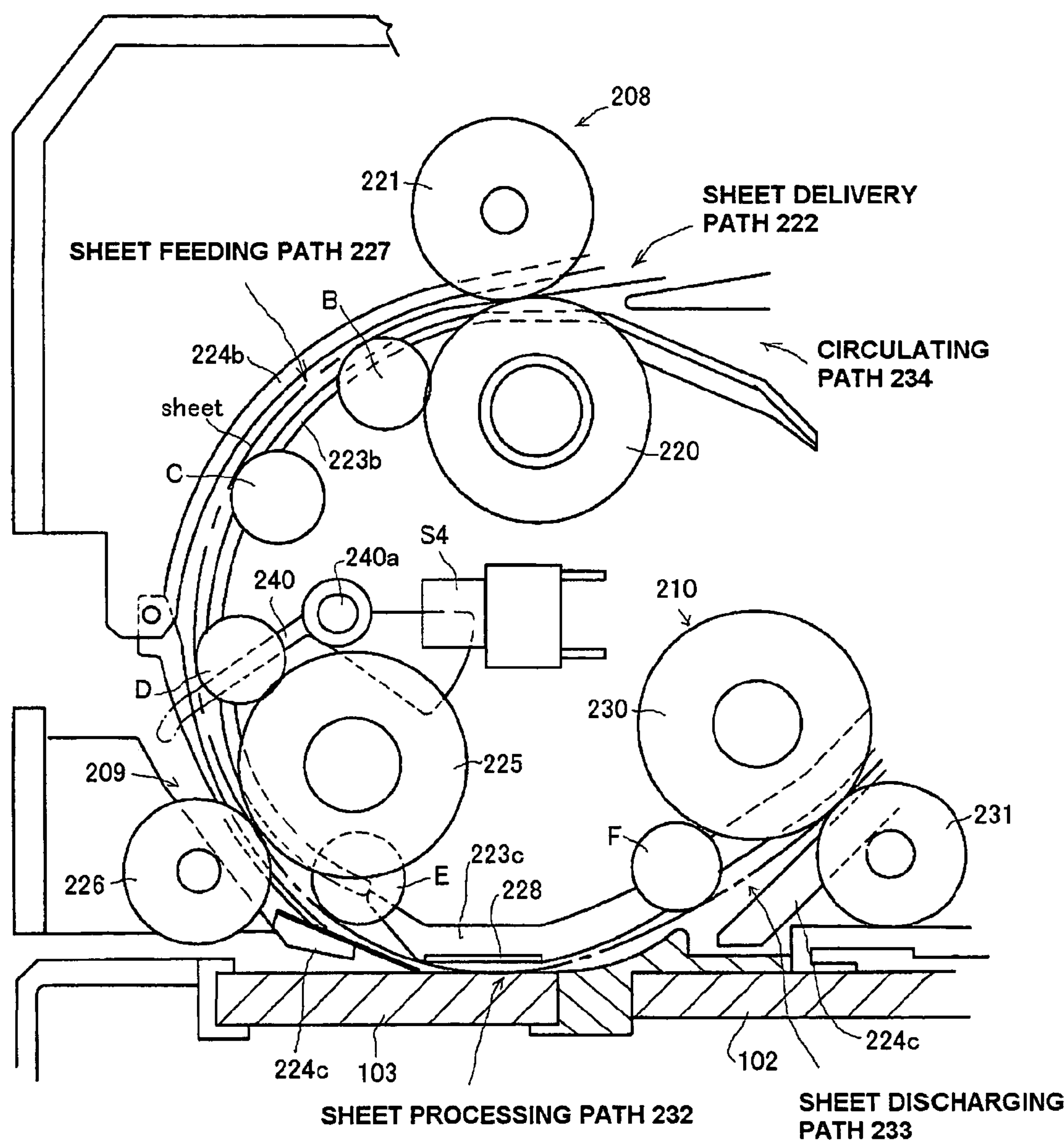
FIG. 5 is a view showing a mechanism portion that conveys a sheet into and out of a processing platen of the apparatus shown in FIG. 1.

The idle rollers B, C, and D are arranged in the sheet feeding path 227 with a substantially equal interval in the sheet conveying direction as shown in FIG. 3. In the direction orthogonal to the sheet conveying direction, the upstream rollers B and C are arranged at two positions, i.e. the left and right sides of the center reference, respectively. The downstream rollers D are arranged at five positions; one at the center, two at the right side of the center reference, and two at the left side of the center reference. The downstream rollers D are arranged at the five positions so as to engage almost all area of the sheet. A sensor (timing sensor S4, described later) is provided for detecting the leading end of the sheet as shown in FIG. 5. The sensor S4 must provide an accurate reference signal for an initial position (read start line or print start line) used when the downstream processing platen (second platen) 103 reads or prints an image.

Thus, the timing sensor S4 employs a structure in which a tip of a sensor lever 240 lies in the sheet feeding path 227 so that a photo coupler detects a rotational movement of the tip when the leading end of the sheet contacts the sensor lever 240. When the rollers convey various sheets such as cardboard and thin sheet, the lever 240 rotates around the rotating shaft 240*a* at various positions where the leading end of the sheet contacts the lever, thereby causing a variation in detection timing. For this reason, the idle rollers D are arranged at the five positions so as to thoroughly regulate the widthwise leading end of the sheet at a position close to the sensor lever 240, thereby reducing the deviation of the position at which the sensor lever 240 abuts against the sheet.

The idle rollers E and F are arranged in the processing path 232. The processing platen 103 is provided in the processing path 232 for reading the image as previously described. It is necessary to dispose conveying means in front of and behind the processing platen 103 for stably feeding and conveying the sheet. In the embodiment, a pair of sheet feeding rollers is provided at an upstream side of the processing platen 103, while a pair of sheet conveying rollers is provided at a downstream side of the processing platen 103. The sheet feed driving rollers 225 and the conveyance driving rollers 230 are provided in the conveyance guide 223C located inside the processing path 232 (inside the U-shape conveying path). As shown in FIG. 3, the sheet feed driving rollers 225 and conveyance driving rollers 230 include four rollers for engaging almost all the widthwise area (length) of the sheet. On the other hand, the sheet feed driven rollers 226 and the conveyance driven rollers 231 contacting the driving rollers to rotate are rotatably attached to the conveyance guide 224C located outside the U-shape conveying path.

The idle rollers E are provided at five locations near the respective sheet feed driving rollers 225. The idle rollers F are provided at five locations near the respective conveyance driving rollers 230. The idle rollers E and F are aligned with one another in the sheet conveying direction so as to engage the sheet at the same positions, thereby minimizing stress on the sheet. In particular, the rollers E and F are desired to smoothly and stably feed the sheet to the processing platen. Thus, the idle rollers E, located at an upstream side of the processing platen, are arranged so that the outer diameter of the idle rollers E crosses the outer diameter of the sheet feed driving rollers 225 in the sheet conveying direction (see FIG. 5).

In the U-shape conveying path, when the trailing end of the sheet passes through (leaves) the sheet feeding rollers, a shock is transmitted to the sheet processing section, thereby affecting the processing accuracy. For example, when a line sensor is reading an image on the sheet, if the trailing end of the sheet curved in a U shape hits against a reading platen, a vibration is transmitted to the entire sheet, thereby lowering the reading accuracy. Accordingly, each of the idle rollers E crosses the corresponding sheet feed driving roller 225 to prevent the trailing end of the sheet from fluttering.

The idle rollers E also prevent the sheet from fluttering near the conveyance driving rollers 230 when the leading end of the sheet rushes into the pair of sheet conveying rollers. When the leading end of the sheet rushes in and abuts against the pair of sheet conveying rollers, the sheet floats from the processing platen (second platen) and flutters, thereby affecting the processing accuracy. Accordingly, the idle rollers F are arranged in proximity to the conveyance driving rollers 230 at a downstream side of a significantly bent portion of the conveyance guide 224C as shown in FIG. 5.

A configuration and operation of the idle rollers E and F will be explained in detail with reference to FIGS. 5 to 8. The outer diameter of the idle rollers E is selected to be sufficiently smaller than that of the sheet feed driving rollers 230. Since the sheet feed driving rollers control the running speed of the sheet, there is a limit in the roller diameter. The processing platen 130 normally has a flat surface, so that a triangular space is created as indicated by K in FIG. 7. Accordingly, the leading and trailing ends of the sheet entering the triangular space must be controlled. The idle rollers E, which guide and regulate the sheet, are preferably set in accordance with the following conditions. The diameter d1 of the sheet feed driving rollers 225, the diameter d2 of the sheet feeding pinch rollers 226, and the diameter d3 of the idle rollers E have the relationship d1>d2>d3. This is required for minimizing the size of the space K. In the figure, the ratio of d1 to d3 is 2:1.

Figure 7:
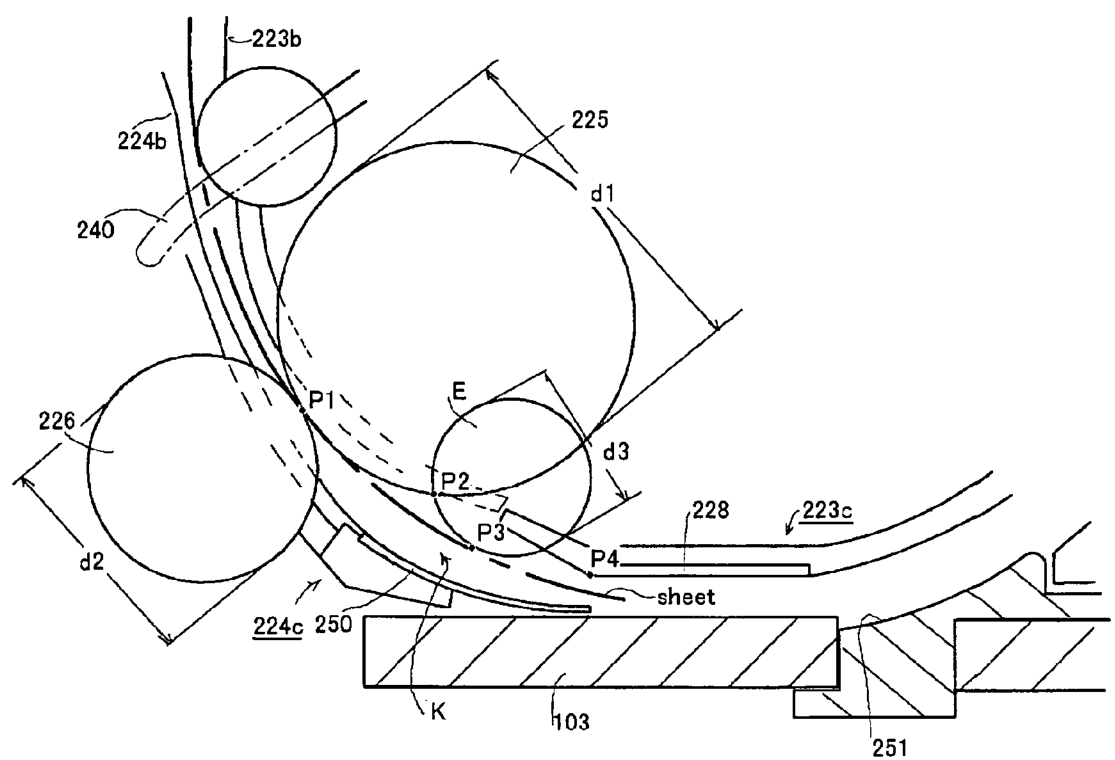
FIG. 7 is a view for explaining a process in which a leading end of a sheet enters the processing platen of the sheet conveying mechanism shown in FIG. 5.

Then, the outer periphery of the sheet feed driving rollers 225 is allowed to cross the outer periphery of the corresponding idle rollers E in the sheet feeding direction (see FIG. 7). In the figure, reference numeral P2 denotes a point at which the outer peripheries of both rollers cross each other. The crossing point P2 is set to lie on the outer periphery of a semicircle corresponding to a lower part of the roller E in the horizontal direction. If the point P2 is located on the outer periphery of a semicircle corresponding to an upper part of the roller E, the leading end of the curled sheet is caught at the crossing point P2, thereby causing a jam. This problem can be solved using a method described later.

The sheet is guided by the outer periphery P1 of the roller 225 and the outer periphery P2 of the roller E to reach the platen 103 through a locus shown indicated by a projected line in the figure (designed locus). Each of the rollers 225 is allowed to cross the corresponding roller E so that the moving locus of the sheet is located between a point P4 on the guide member 223C, which lies opposite to the platen, and a point P5 on the guide member 224C, which guides the sheet. The sheet guided to the processing platen 103 is regulated by the two rollers and the guide members 223C and 224C guide an irregular sheet such as a curled sheet to the platen. The guide member 224C molded of a resin is located outside the U shape conveying path, and has a guide member 250 formed of a plastic film (Mylar) at a leading end thereof. The guide member 250 is elastically deformed so that the leading end closely contacts the processing platen 103, thereby preventing a step.

The sheet feed driving roller 225 and the idle roller E cross each other so that the crossing point P2 between the outer peripheries of both rollers lies on the outer periphery of the semicircle corresponding to the upper part of the idle roller E in the horizontal direction. Also, the guide member 223*b* constituting the conveying path is provided in the path below the crossing point so as to prevent the leading end of the curled sheet from entering the crossing point P2. In this case, the moving locus of the sheet is designed such that the sheet is guided to the processing platen 103 by the outer periphery P1 of the roller 225 and an outer periphery P3 of the idle roller E, thereby reducing the size of the idle roller E.

Figure 8:
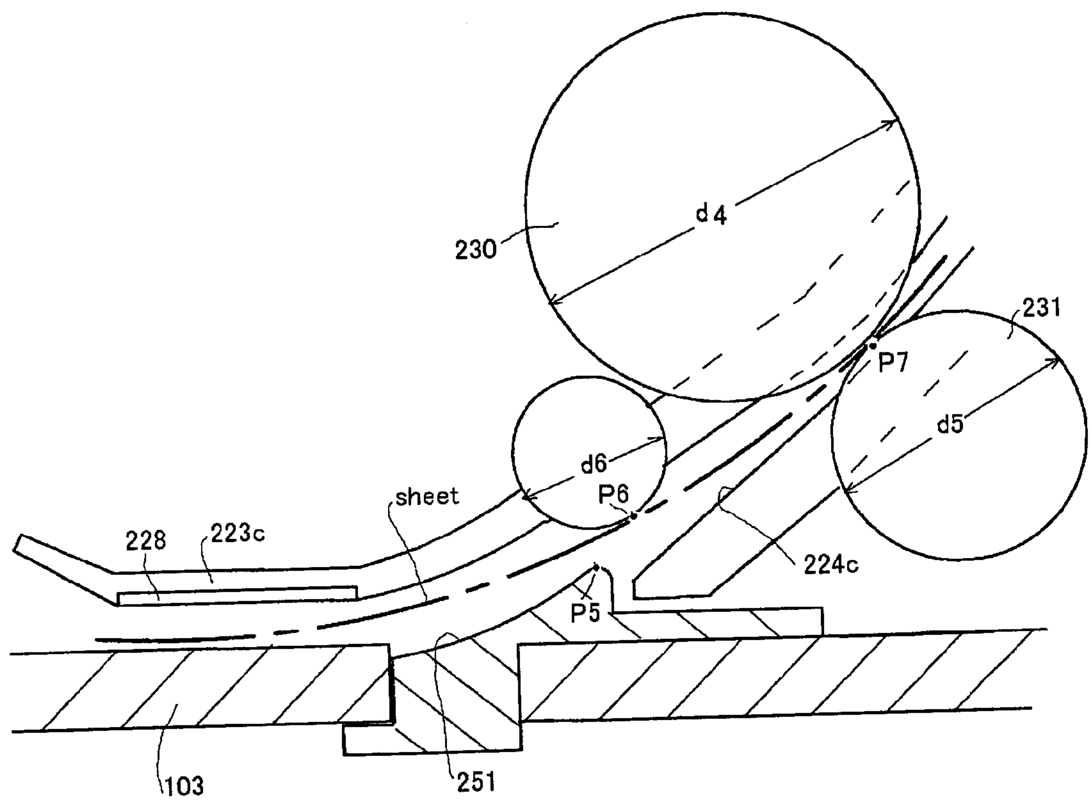
FIG. 8 is a view for explaining a process in which a trailing end of the sheet is conveyed out of the processing platen of the sheet conveying mechanism shown in FIG. 5.

FIG. 8 shows a structure that guides the sheet from the processing platen 103 to the sheet conveying rollers 210. A scooping guide 251 is provided at a downstream side of the processing platen 103 and a side of the image reading apparatus for scooping up the sheet. Each conveyance driving roller 230 and the corresponding conveyance pinch roller 231 are arranged so as to contact with each other at a point P6 on a (designed) locus shown by a projected line along which the platen 103 and the guide 251 guide the sheet through the points P4 and P5. The idle rollers F are arranged to guide the sheet between the leading end P5 of the guide 251 and the roller contact point P6. The diameter d4 of each roller 230, the diameter d5 of each roller 231, and the diameter d6 of each roller F have a relationship of d4>d5>d6. This configuration is used for the same reason as that for the rollers 225, rollers 226, and rollers E as described above. Moreover, the diameter d4 of each roller 230 is set to be the same as that d1 of each roller 225, and the configuration is such that d1=d4, d2=d5, and d3=d6. The same sheet conveying conditions are obtained in front of and behind the processing platen 103 to avoid unwanted stress on the sheet.

Figure 6:
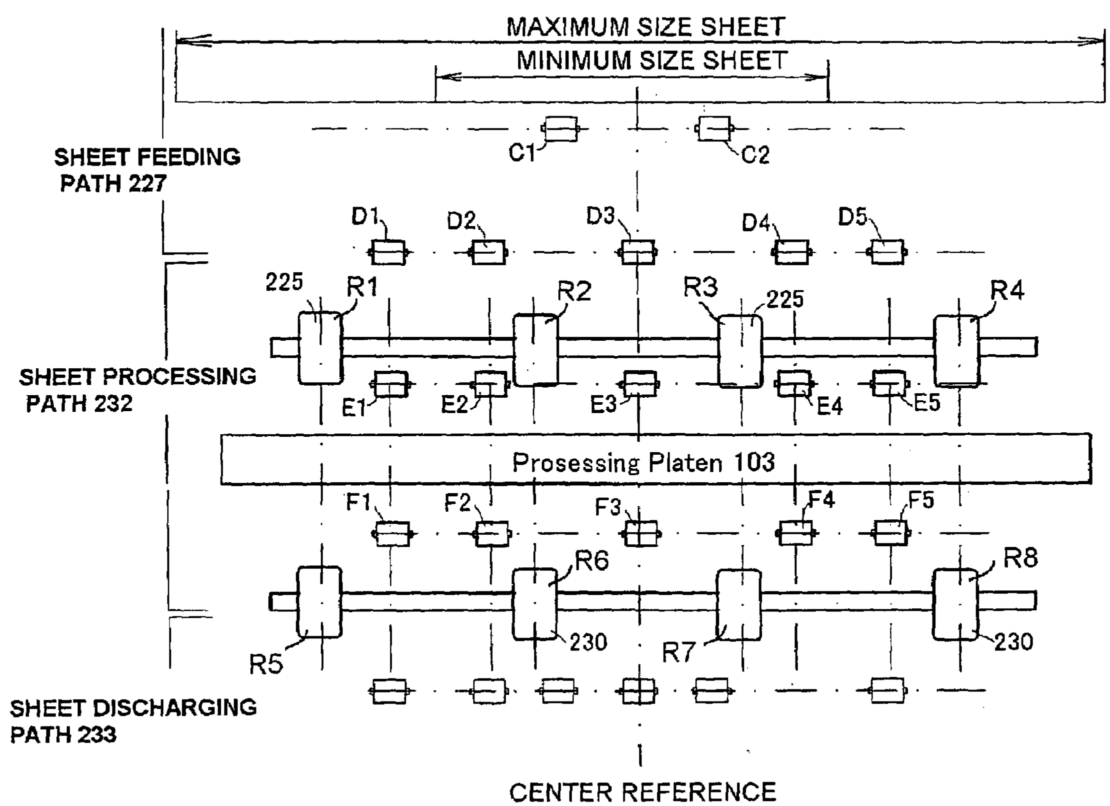
FIG. 6 is a view showing the conveying path shown in FIG. 5 in a two-dimensionally expanded state.

FIG. 6 shows a two-dimensional expansion of the sheet processing path located in front of and behind the processing platen 105 shown in FIG. 5. The figure shows that the sheet is conveyed with the center reference. The sheet feed driving rollers 225 are composed of four rollers R1, R2, R3, and R4. The idle rollers E1 and E2 are arranged between the rollers R1 and R2 so that each idle roller crosses each roller R1 or R2 in the sheet conveying direction. The roller R3 is placed between the rollers R2 and R3. The rollers E4 and E5 are arranged between the rollers R3 and R4. Likewise, the conveyance driving rollers 230 are composed of rollers R5, R6, R7, and R8. The idle rollers F1 and F2 are arranged between the rollers R5 and R6. The roller F3 is placed between the rollers R6 and R7. The rollers F4 and F5 are arranged between the rollers R7 and R8. As shown in the figure, each sheet feed driving roller 225 and each conveyance driving roller 230 have the same structure in the direction orthogonal to the sheet conveying direction. Likewise, the idle rollers E and F have the same configuration.

The idle rollers G, H, and I, shown in FIGS. 1 to 3, are attached to the conveyance guide 224D provided in the sheet discharging path 233 and located outside the U-shape conveying path. The sheet discharging path 233 is curved in the direction opposite to a direction that the sheet feeding path is curved so that a radius of curvature is located outside the U shape path. Consequently, the sheet is curved in an S shape in opposite directions in the sheet feeding path and processing path before being fed to the sheet discharging stacker 203. In the sheet discharging path 223, the idle rollers G are arranged at five positions, the rollers H are arranged at six positions, and the rollers I are arranged at four positions in the width direction.

Figure 9:
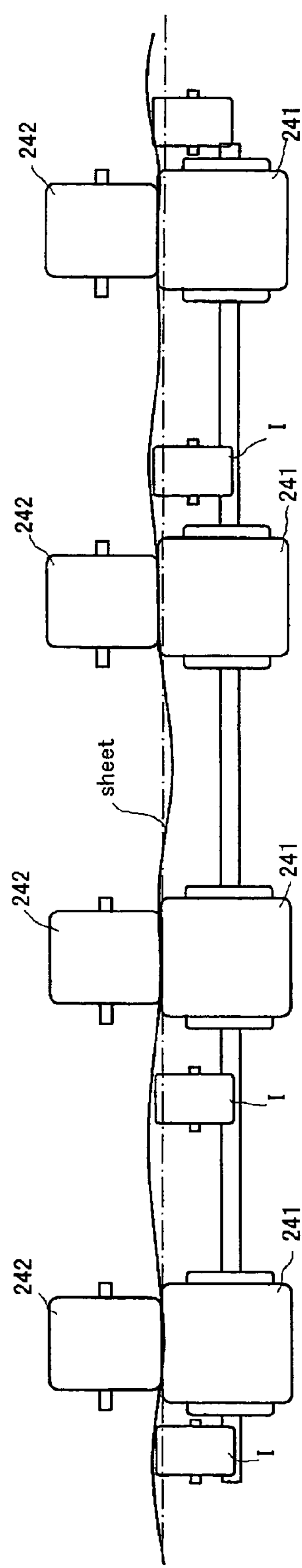
FIG. 9 is a view for explaining a process in which the sheet is conveyed to a sheet discharging stacker of the apparatus shown in FIG. 1.

The sheet discharging rollers 212 composed of the sheet discharge driving rollers 241 and the sheet discharge driven rollers 242 are provided in the sheet discharging path 223. The driving rollers 241 are arranged in the conveyance guide 224D, located outside the U-shape conveying path. FIG. 9 shows the relationship between the driving rollers 241 and the idle rollers I. The sheet discharge driving rollers 241 are composed of four spaced rollers, and each idle roller I is placed between the sheet discharge driving rollers 241. Each idle roller I is located above a contact point between the corresponding driving roller 241 and driven roller 242. Accordingly, it is possible to bend the sheet to be discharged to the sheet discharging stacker 203 in the direction orthogonal to the sheet conveying direction so that the sheet can be forcefully discharged with rigidity of the sheet.

The circulating path 234 is connected to the sheet discharging path 233 so that the sheet discharging rollers 212 feed the sheet to the register driving rollers 220. In the figure, reference numeral 235 denotes a path switching gate. The path switching gate 235 is located at a position as shown by a solid line in FIG. 2 owing to its own weight. The sheet passing through the sheet discharging path 233 pushes up the gate, so that the gate assumes the posture shown by a phantom line in FIG. 2. The sheet then reaches the sheet discharging stacker 203. In the sheet discharging path 233, the idle rollers J are arranged in the conveyance guide 233E, located inside the U-shape conveying path. The idle rollers J have a configuration similar to that of the idle rollers described above.

A mechanism for moving the sheet from the sheet feeding stacker 203 to the sheet discharging stacker will be explained with reference to FIGS. 10 and 11. In the path from the sheet feeding stacker to the sheet discharging stacker, the pickup roller 204, the separating roller 213, the register driving rollers 220, the sheet feed driving rollers 225, the conveyance discharging rollers 230, and the sheet discharge driving rollers 241 are arranged in this order. These rollers may be controlled by individual driving motors, but in the figures, the rollers are connected to two driving motors M1 and M2 that can be rotated in forward and reverse directions.

Figure 10:
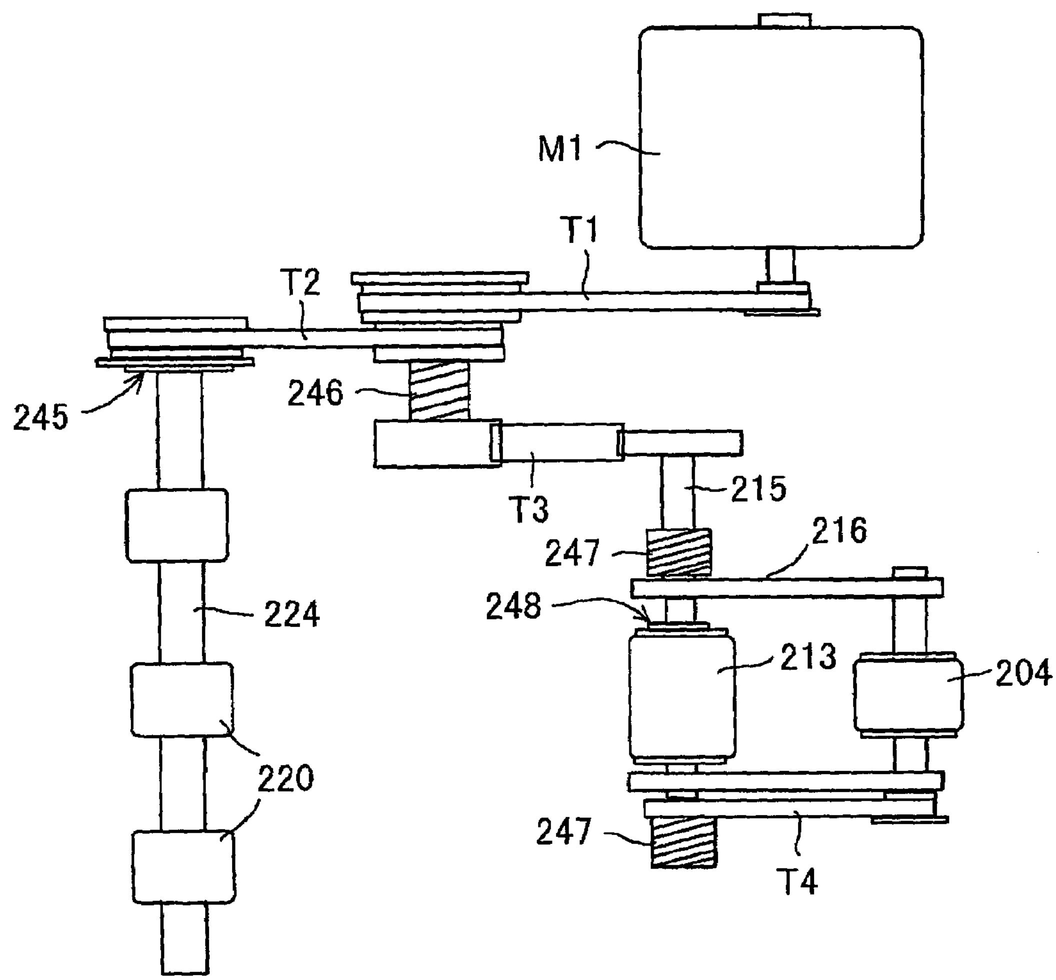
FIG. 10 is a view showing a driving mechanism of separating means and register means of the apparatus shown in FIG. 1.

As shown in FIG. 10, the first driving motor M1 is connected to the separating roller 213, and also connected to the pickup roller connected to the separating roller 213 and the register driving rollers 220. When the first driving motor M1 is rotated in the forward direction, the separating roller 213 is rotated. When the first driving motor M1 is rotated in the reverse direction, the pickup roller and the register driving rollers 220 are rotated. Rotation of the driving motor M1 in the forward or reverse direction also controls the elevation and lowering of the pickup roller 204. The driving motor M1 is connected to a rotating shaft 244 of the register driving rollers 208 via transmission belts T1 and T2.

A one way clutch 245 transmits rotation only in one direction to the rollers 208. The motor M1 uses a gear T3 to transmit driving to the rotating shaft 215 of the separating roller 213 via a spring clutch 236. The one way clutch 245 and the spring clutch 246 transmit the forward rotation of the motor M1 to the separating roller and the reverse rotation to the register rollers. The bracket 216 is provided on the rotating shaft 215 of the separating roller 213 via a spring clutch 248.

A transmission belt T4 is used to transmit rotation of the rotating shaft 215 to the pickup roller 204 attached to the bracket 216. When the driving motor M is rotated in the forward direction (counterclockwise direction in the figure), the spring of the spring clutch 246 is contracted to transmit the rotation to the gear T3 to rotate the rotating shaft 215 counterclockwise. Then, the separating roller and the pickup roller start to rotate. At the same time, the spring clutch is loosened to release the bracket 216 to lower the pickup roller in the state shown in FIG. 2, onto the sheet feeding stacker. The one way clutch 245 does not transmit any rotation of the motor to the register driving rollers 220.

Accordingly, the forward rotation of the driving motor M lowers the pickup roller 204 from a raised standby position. The pickup roller 204 then abuts against the sheets on the sheet feeding stacker. The delivery separating roller 213 then separates one sheet from the others on the stacker. When the driving motor M1 is rotated in the reverse direction (clockwise direction in the figure), the contracted spring clutch 246 transmits the rotation to the rotating shaft 215. However, the one way clutch 245 in the separating roller 248 keeps the rollers 248 and 204 stationary. The rotation of the rotating shaft 215 is transmitted to the bracket 216. The bracket 216 and the pickup roller attached to the bracket 216 are rotated counterclockwise in FIG. 2 to return to the raised standby position above the sheet feeding stacker.

A stopper (not shown) is provided at the standby position to prevent a further rotation of the bracket 216 and rotating shaft 247. Then, the spring clutch 246 is loosened to stop transmitting the rotation of the motor to the separating roller. At this time, the one way clutch 245 transmits the rotation to the register driving rollers 220. The above structure can be realized by setting the rotation transmitting directions of the one way clutch and spring clutch.

Figure 11:
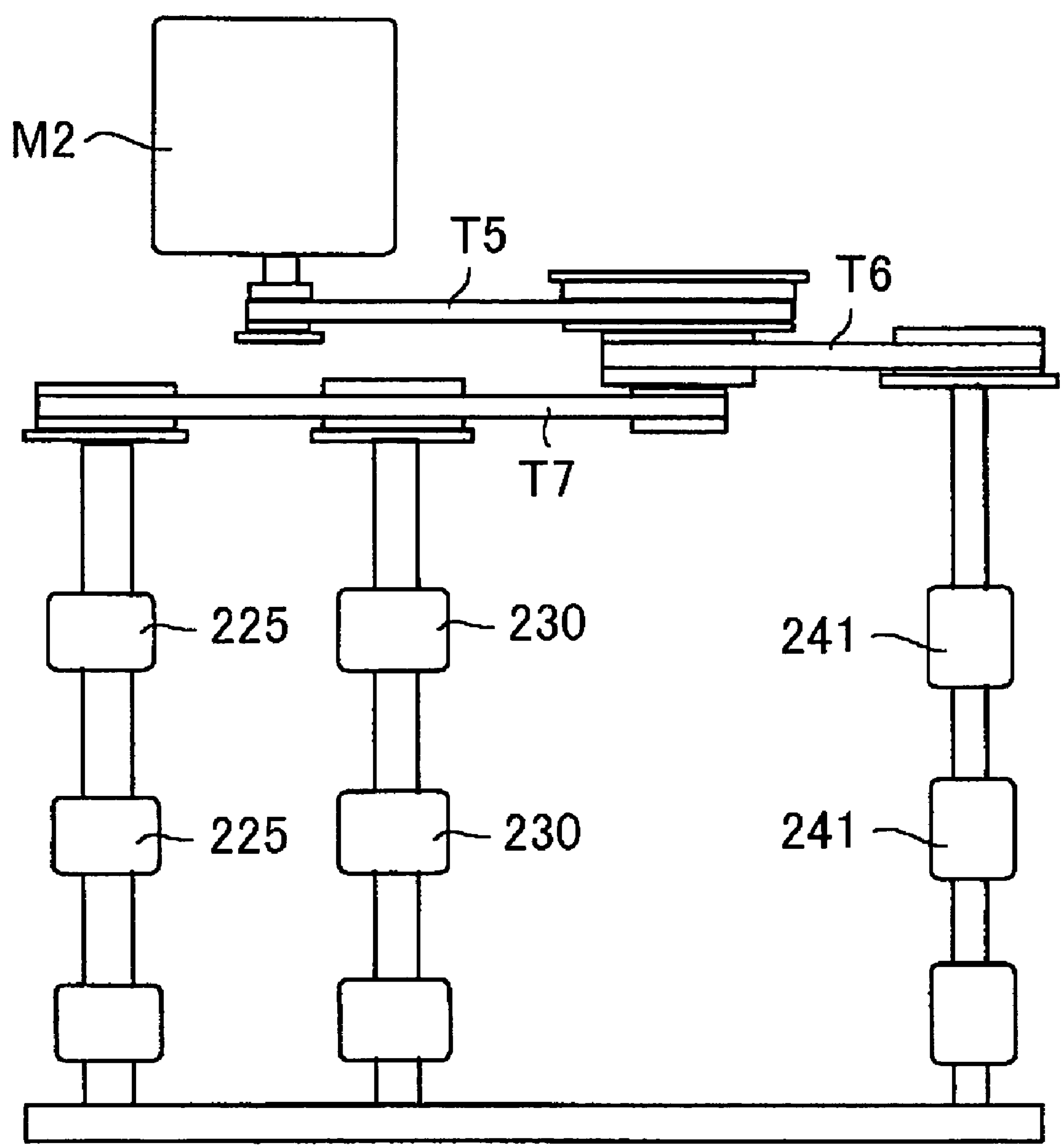
FIG. 11 is a view showing sheet feeding means and sheet conveying means of the apparatus shown in FIG. 1.

As shown in FIG. 11, the driving motor M2 is connected to the sheet feed driving rollers 225, the conveyance driving rollers 230, and the sheet discharge driving rollers 241 via transmission belts T5, T6, and T7. A one way clutch (not shown) is used to transmit both forward and reverse rotations of the motor to the sheet feed driving rollers 225 and the conveyance driving rollers 230 as unidirectional rotations. The forward and reverse rotations of the motor rotate the sheet discharge driving rollers in the forward and reverse directions, respectively.

As described above, for the register driving rollers 208, sheet feed driving rollers 225, conveyance driving rollers 230, and sheet discharge driving rollers 241 arranged in the conveying path, the driven rollers 221, 226, 231, and 242, respectively, are attached to the second conveyance guide 224. The sheet conveying roller pairs are set at the same peripheral speed so as to apply an equal conveying force to the sheet. However, it is difficult to manufacture driving rollers so that they have exactly the same diameter. Accordingly, tolerances are set so that the downstream driving rollers have higher peripheral speeds within an allowable range for the processing accuracy. Specifically, considerations are given to prevent the downstream driving rollers from having lower dimensional accuracies than the upstream driving rollers. Further, settings are made so as to prevent the downstream driven rollers from having lower contact pressures.

As shown in FIG. 2, sensors are placed in the conveying path to detect the leading end of the sheet. The sensors and their operations will be described. A plurality of sensors is arranged on the sheet feeding stacker 202 to detect a size of the sheets. The sensors detect the size of the sheet to control the conveyance of the succeeding sheets. For these sensors, various types of structures and control are well known, and a description of the sensors is omitted.

An empty sensor S1 is provided at the leading end of the sheet feeding stacker 202 to detect whether or not the sheets are placed on the stacker. The empty sensor S1 detects that the final sheet is fed to send a signal to a processing apparatus such as the image reading unit. A separation sensor S2 is provided at a downstream side of the separating means 207. If no sheet is detected for a predetermined time after the separating roller 213 sends a rotation activation signal (sheet feed instruction signal), the separation sensor S2 determines a non-feed status to stop the apparatus, while giving a warning.

A register sensor S3 is provided in front of the register means 208 to detect the leading end of the sheet. The register sensor S3 also issues a motor stop signal to a control section for the driving motor M1 after a period of time within which a predetermined registration loop is expected to be formed. The timing sensor S4 (see FIG. 5) is provided in front of the sheet feeding rollers 225 to inform the processing apparatus (image reading unit 100) of the arrival of the leading end of the sheet. The timing sensor S4 thus determines a line to start reading or printing an image. If no sheet is detected for a predetermined time after a sheet feed instruction signal for the register driving rollers 208, the senor determines a jammed status to stop the apparatus, while giving a warning.

A sheet discharge sensor S5 is placed at a downstream side of the conveyance driving rollers 230 to detect the leading and trailing ends of the sheet to determine the jammed status. In a sheet circulation mode, the sensor detects the trailing end of the sheet to issue a signal. Then, after a predetermined time after the sheet trailing end detection signal, the sensor operates to rotate the driving motor M2 in the opposite direction.

An operation of the apparatus will be described next. The image reading apparatus, generally shown in FIG. 1, has a single side read mode in which one side of the original on the sheet feeding stacker is sequentially read, and a double side read mode in which after one side of the original is read, the original is turned upside down so that a backside thereof is read.

In the single read mode, a user inputs a mode setting command to the image reading unit 100 or uses another device such as a computer connected to the image reading unit 100 to issue a mode setting command. When the image reading unit 100 receives the command, a carriage 111 in the reading section 104 performs an initialize operation and then moves to the second platen 103, where it stops. After the initialize operation, the control section of the reading unit 100 sends a signal to the sheet supplying unit 200 requesting it to get ready for a job operation. The empty sensor S1 detects whether or not the sheets are present on the sheet feeding stacker 202. The empty sensor S1 then sends the result to the image reading unit 100.

If the sheets are present on the stacker, the driving motor M1 is rotated to cause the pickup roller 204 and the separating roller 213 to deliver the uppermost sheet. The sheet is then fed to the register means 208, and a signal from the register sensor S2 stops the driving motor M1 after a predetermined time. In this state, the sheet stands by with its leading end abutting against the pairs of register rollers. Then, the image reading unit 100 issues a sheet feed instruction signal. The driving motor M2 is rotatably activated to feed the sheet to the sheet feeding path 227 using the register driving rollers 208. Then, the timing sensor S3 in the sheet feeding path 227 detects the leading end of the sheet. The timing sensor S3 sends a corresponding signal to the image reading unit 200. The image processing unit 200 calculates the time when the leading end of the sheet reaches the processing platen (second platen 103). The sheet feeding rollers 225 and 226 feed the sheet reaching the sheet feeding path 227, to the processing platen 103.

On the basis of the signal from the timing sensor S3, the processing platen determines the initial position of the sheet and then executes a process such as reading or printing the image. The pairs of sheet conveying rollers 230 and 231 feed the sheet 103 from the processing platen 103 to the sheet discharging path 233. In the single side mode, the pairs of sheet discharging rollers 241 and 242 in the sheet discharging path 233 house the sheet in the sheet discharging stacker 203.

On the basis of the sheet trailing end detection signal from the register sensor S2, after the next sheet enters the sheet feeding path 227, the driving motor M1 is rotated in the reverse direction. The next sheet on the sheet feeding stacker 202 is fed to the pair of register rollers, where it stands by. The apparatus then gets ready for the next sheet feed instruction signal. The next sheet may be automatically fed after a predetermined interval from the trailing end of the preceding sheet, or the apparatus may wait for the sheet feed instruction signal from the image reading unit 100.

In the double side mode, the driving motor M2 is rotated in the reverse direction with reference to a signal generated when the sheet discharge sensor S4 in the sheet discharging path 233 detects the trailing end of the sheet. Then, the pairs of sheet discharging rollers 241 and 242 rotate in the reverse direction to switch back the sheet. The path switching gate 235 then feeds the sheet to the circulating path 234. The sheet from the circulating path is turned upside down and directed to the processing platen 103 by the pairs of register rollers and the pairs of sheet feeding rollers. The processing platen then processes the back side of the sheet. The pairs of sheet conveying rollers then convey the sheet from the sheet discharging path 233 to the sheet discharging stacker 203, where it is housed.

When the sheet is moved from the sheet feeding stacker 202 to the sheet discharging stacker 203, the idle rollers A to J, provided in association with the respective conveying paths, operate as described below. When the sheet is fed from the sheet feeding stacker 202 to the pairs of register rollers 220 and 221, the leading end of the sheet advances along the conveyance guide 223A but the curled sheet may be caught in the conveyance guide. However, the idle rollers A allow even the curled sheet to advance smoothly to avoid a jam in the sheet delivering path 222. When the pairs of register rollers 208 and 221 withdraw the leading end of the sheet, the separating roller 213 and the frictional pad 214 impose a heavy load on the trailing end of the sheet. However, on this occasion, the idle rollers A prevent the conveyance guide 223A from generating frictional resistance to impose an excessive load on the sheet. This prevents a wide range of the sheets from thin paper to cardboard from undergoing an unexpected load exceeding a load expected to be imposed by the separating means 207 and estimated during the design of the apparatus.

Before the leading end of the sheet reaches the pairs of sheet feeding rollers 225 and 226, when the leading end of the sheet abuts against and activates the sensor lever 240, the idle rollers B, C, and D suppress the disturbance of the sheet. The idle rollers B, C, and D abut against predetermined positions of the lever to activate it. This makes it possible to reduce detection errors in the timing sensor S4 (see FIG. 5).

When the leading end of the sheet reaches the processing platen (second platen 103), the idle rollers E feed the sheet to the processing platen while preventing the leading end of the sheet from floating. When the trailing end of the sheet slips out of the pairs of sheet feeding rollers, vibration caused by the flip-up of the sheet is transmitted throughout the sheet to prevent the degradation of the accuracy (see FIGS. 5 and 7). When the leading end of the sheet abuts against the pairs of sheet conveying rollers 230 and 231, the idle rollers F prevent the sheet from floating from the processing platen (see FIGS. 5 and 8).

When the pairs of sheet discharging rollers 241 and 242 discharge the sheet to the sheet discharging stacker 203 through the sheet discharging path 233, the idle rollers I allow the sheet to be flexed in the direction orthogonal to the sheet conveying direction. The rigidity attributed to the flexure ensures that the sheet is housed in the sheet discharging stacker 203 (see FIG. 9).

During the above process, the heaviest load acts when the leading end of the sheet lies in the sheet discharging path 233, whereas the trailing end lies in the pairs of register rollers 208 and 221 or when the trailing end of a long sheet is located in the separating roller. In this state, the speed at which the sheet is conveyed may decrease or the sheet is inappropriately conveyed to stop the apparatus. However, the idle rollers arranged in the U-shape conveying path reduce the load attributed to a possible friction in the conveyance guide located inside the U shape. This allows the sheet to be appropriately conveyed. A heavy load also acts when the leading end of the sheet lies in the sheet discharging path, whereas its trailing end lies in the downstream sheet conveying or feeding rollers. However, since in the sheet discharging path, the idle rollers G, H, and I are arranged outside the U-shaped path, these rollers act to convey the sheet smoothly.

The present invention is configured as described above. When the sheet is fed from the sheet feeding stacker to the sheet discharging stacker through the substantially U-shape conveying path, the idle rollers arranged inside the U shape guide the sheet from the sheet feeding stacker to the processing platen, while reducing a possible load on the sheet. The idle rollers arranged outside the U shape path guide the sheet from the processing platen to the sheet discharging stacker. It is possible to significantly reduce a possible frictional load throughout the conveying path. Therefore, a wide range of the sheets from thin paper to cardboard, notably cardboard, can be accurately fed to and conveyed out of the processing platen. Furthermore, the size and weight of the apparatus can be reduced.

Further, the sheet feeding rollers and the idle rollers crossing the respective sheet feeding rollers guide the leading and trailing ends of the sheet entering the processing platen. This reduces the shock vibration when the leading end of the sheet rushes into the processing platen or the trailing end of the sheet leaves the sheet feeding rollers. Therefore, a process such as image reading can be stably executed.

The disclosures of Japanese Patent Application No. 2003-167741 and Japanese Patent Application No. 2003-167749 have been incorporated in the application.

While the invention has been explained with reference to the specific embodiments of the invention, the explanation is illustrative and the invention is limited only by the appended claims.

What is claimed is:

1. A sheet supplying apparatus for supplying a sheet, comprising:

a sheet feeding stacker for storing the sheet, a sheet discharging stacker arranged parallel to the sheet feeding stacker in a vertical direction for receiving the sheet, a processing platen for processing the sheet, separating means disposed adjacent to the sheet feeding stacker for separating the sheet on the sheet feeding stacker, register means disposed adjacent to the separating means for temporarily stopping the sheet transported from the separating means and conveying the sheet toward a downstream side, sheet feeding means disposed adjacent to the processing platen for conveying the sheet from the register means to the processing platen, sheet conveying means disposed adjacent to the processing platen for conveying the sheet from the processing platen toward a downstream side, sheet discharging means disposed adjacent to the sheet conveying means for discharging the sheet from the sheet conveying means to the sheet discharging stacker, a U-shape conveying path disposed between the sheet feeding stacker to the sheet discharging stacker for guiding the sheet, said U-shape conveying path including a sheet delivering path extending from the separating means to the register means, a sheet feeding path extending from the register means to the processing platen, a sheet processing path extending from the sheet feeding means to the sheet conveying means, and a sheet discharging path extending from the sheet conveying means to the sheet discharging means, an inner guide member disposed inside the U-shape path forming the sheet delivering path, sheet feeding path, and sheet processing path, first idle rollers disposed in the inner guide member of the U-shape conveying path for contacting the sheet to rotate, an outer guide member disposed outside the U-shape path forming the sheet discharging path, and at least one second idle roller disposed in the outer guide member for contacting the sheet to rotate.

2. A sheet supplying apparatus according to claim 1, wherein each of said register means, said sheet feeding means, said sheet conveying means, and sad sheet discharging means is formed of at least one pair of rollers contacting each other.

3. A sheet supplying apparatus according to claim 2, wherein each of the pair of the rollers constituting said register means, sheet feeding means, and sheet conveying means located inside the U-shape path is formed of a driving roller, and one of said rollers constituting the discharge means and located outside the U-shape path is a driving roller.

4. A sheet supplying apparatus according to claim 2, wherein said at least one of the first idle rollers disposed at the upstream side of the processing platen is arranged such that an outer periphery thereof crosses an outer periphery of the roller constituting the sheet feeding means in a direction that the sheet is conveyed.

5. A sheet supplying apparatus according to claim 2, wherein said at least one second idle roller disposed in the sheet discharging path projects from a sheet contact surface of the pair of the rollers constituting the sheet discharging means for bending the sheet in a direction perpendicular to a direction that the sheet is conveyed.

6. A sheet supplying apparatus according to claim 2, wherein said first idle rollers are arranged in the sheet delivering path in one row, arranged in the sheet feeding path in three rows, and arranged in the sheet processing path in two rows, and said second idle rollers are arranged in the sheet discharging path in three rows.

7. A sheet supplying apparatus according to claim 1, wherein said processing platen includes image processing means for reading an image on the sheet.

8. A sheet supplying apparatus according to claim 1, wherein at least three of said first idle rollers are disposed in the sheet feeding path in a direction that the sheet is conveyed.

9. A sheet supplying apparatus according to claim 1, further comprising a sensor lever disposed in the sheet feeding path for detecting a leading end of the sheet, at least one of the first idle rollers located in the sheet feeding path being disposed adjacent to the sensor lever.

10. A sheet supplying apparatus according to claim 1, wherein said first idle rollers are formed at upstream and downstream sides of the processing platen.

11. A sheet supplying apparatus according to claim 1, further comprising a circulating path for guiding the sheet from the sheet discharging means to the register means, at least one of said idle rollers being arranged in the circulating path.

12. A sheet reading apparatus comprising the sheet supplying apparatus according to claim 1, and photoelectric converting means disposed under the processing platen for reading an image of the sheet on the processing platen.

13. A sheet supplying apparatus for supplying a sheet, comprising:

a sheet processing platen;

a sheet feeding roller disposed adjacent to the sheet processing platen for supplying the sheet to the processing platen, said sheet feeding roller including at least two feeding rollers spaced in a direction perpendicular to a direction that the sheet is supplied, a sheet conveying roller disposed adjacent to the sheet processing platen for conveying the sheet out of said processing platen, a guide member facing the processing platen to form a sheet conveying path and extending from the sheet feeding roller to the sheet conveying roller, and at least one first idle roller disposed between the feeding rollers for contacting the sheet to rotate, said first idle roller being arranged such that an outer periphery of the idle roller crosses an outer periphery of one of the sheet feeding rollers in the direction that the sheet is conveyed for guiding the sheet to the processing platen with the outer peripheries of the feeding rollers and the outer periphery of the first idle roller.

14. A sheet supplying apparatus according to claim 13, wherein said sheet feeding roller and said sheet conveying roller are arranged above the processing plate, and the guide member has a substantially U-shape.

15. A sheet supplying apparatus according to claim 13, wherein said sheet feeding roller, said first idle roller, and said guide member are arranged so that the sheet is guided from the sheet feeding roller to the processing platen via the sheet feeding roller and the at least one first idle roller in this order.

16. A sheet supplying apparatus according to claim 13, wherein each of said sheet feeding roller and said sheet conveying roller includes a pair of rollers contacting each other, one of said pair of the rollers provided in the guide member facing the platen being connected to a driving motor.

17. A sheet supplying apparatus according to claim 13, further comprising at least one second idle roller disposed between the processing platen and the sheet conveying roller for contacting the sheet to rotate.

18. A sheet supplying apparatus according to claim 17, wherein said sheet feeding roller and said sheet conveying roller are arranged so as to engage the sheet at a same position in a direction perpendicular to the direction that the sheet is supplied, and said at least one first idle roller and said at least one second idle roller are arranged so as to engage the sheet at a same position in a direction perpendicular to the direction that the sheet is supplied.

19. A sheet supplying apparatus comprising:

a sheet feeding stacker and a sheet discharging stacker arranged parallel in a vertical direction, a U-shaped conveying path through which a sheet is guided from the sheet feeding stacker to the sheet discharging stacker, a processing platen placed in the conveying path to process the sheet, a sheet feeding roller for conveying the sheet from said sheet feeding stacker to said processing platen, said sheet feeding roller being composed of at least two rollers spaced from one another in a direction orthogonal to a sheet conveying direction, a sheet conveying roller for conveying the sheet from said processing platen downstream, a sheet discharging roller for discharging the sheet from the sheet conveying roller to said sheet discharging stacker, and an idle roller contacting idly with the sheet and placed between the at least two rollers so that an outer periphery of the idle roller crosses outer peripheries of the at least two rollers in the sheet conveying direction, and the sheet is thus guided to said processing platen using the outer peripheries of the at least two rollers and the outer periphery of said idle roller.

20. An image reading apparatus comprising:

a sheet feeding stacker and a sheet discharging stacker arranged parallel in a vertical direction, a U-shaped conveying path for guiding the sheet from the sheet feeding stacker to the sheet discharging stacker, a processing platen placed in said conveying path, photoelectric converting means for reading an image of the sheet on the processing platen, separating means for separating a sheet from other sheets on said sheet feeding stacker, register means for temporarily stopping the sheet from the separating means and conveying the sheet downstream, a sheet feeding roller for conveying the sheet from the registering means to said processing platen, said sheet feeding roller being composed of at least two rollers spaced from one another in a direction orthogonal to a sheet conveying direction, sheet conveying rollers for conveying the sheet from said processing platen downstream, sheet discharging means for discharging the sheet from the sheet conveying means to said sheet discharging stacker, and an idle roller contacting idly with the sheet and placed between the at least two rollers so that an outer periphery of the idle roller crosses outer peripheries of the at least two rollers in the sheet conveying direction, and the sheet is thus guided to said processing platen using the outer peripheries of the at least two rollers and the outer periphery of said idle roller.

* * * * *